US008743800B2

(12) United States Patent
Hsu

(10) Patent No.: US 8,743,800 B2
(45) Date of Patent: Jun. 3, 2014

(54) METHOD OF MULTIMEDIA BROADCAST MULTICAST SERVICE CONTENT AWARE SCHEDULING AND RECEIVING IN A WIRELESS COMMUNICATION SYSTEM AND RELATED COMMUNICATION DEVICE

(75) Inventor: Chia-Chun Hsu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 427 days.

(21) Appl. No.: 12/839,420

(22) Filed: Jul. 20, 2010

(65) Prior Publication Data

US 2011/0013576 A1 Jan. 20, 2011

Related U.S. Application Data

(60) Provisional application No. 61/226,755, filed on Jul. 20, 2009.

(51) Int. Cl.
*H04W 4/00* (2009.01)

(52) U.S. Cl.
USPC ........................................ 370/329; 348/14.02

(58) Field of Classification Search
USPC ............... 370/329, 330, 332, 333; 348/14.01, 348/14.02, 14.1, 384.1, 388.1; 455/450; 709/231
See application file for complete search history.

(56) References Cited

U.S. PATENT DOCUMENTS

| 2005/0129018 | A1* | 6/2005 | Casaccia et al. | 370/390 |
| 2006/0156363 | A1* | 7/2006 | Wu et al. | 725/113 |
| 2007/0233889 | A1* | 10/2007 | Guo et al. | 709/231 |
| 2008/0022325 | A1* | 1/2008 | Ober et al. | 725/81 |
| 2009/0222855 | A1* | 9/2009 | Vare et al. | 725/39 |
| 2010/0250764 | A1* | 9/2010 | Vare et al. | 709/231 |

FOREIGN PATENT DOCUMENTS

| CN | 1894973 A | 1/2007 |
| CN | 101427512 A | 5/2009 |
| WO | 2005039186 A1 | 4/2005 |
| WO | 2008050220 A1 | 5/2008 |
| WO | 2008063108 A1 | 5/2008 |
| WO | 2009049665 A1 | 4/2009 |

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 8) v8.6.0, Jun. 2009.
3rd Generation Partnership Project; Technical Specification Group Radio Access Network; Evolved Universal Terrestrial Radio Access (E-UTRA); Radio Resource Control (RRC) Protocol specification (Release 8) v8.6.0, Jun. 2009.

(Continued)

*Primary Examiner* — Gary Mui
(74) *Attorney, Agent, or Firm* — Winston Hsu; Scott Margo

(57) ABSTRACT

A method of multimedia broadcast multicast service (MBMS) content aware scheduling and receiving for network of a wireless communication system includes receiving data of different resolutions generated from a data source from an MBMS content provider, and scheduling a plurality of MBMS services of different resolution levels formed with the received data on a plurality of multicast traffic channels overlapping in time, wherein data of an MBMS service of a first resolution level on a first multicast traffic channel are shared with another multicast traffic channel corresponding to an MBMS service of a second resolution higher than the first resolution.

6 Claims, 10 Drawing Sheets

(56) References Cited

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9) v9.0.0, Jun. 2009.

HTC Corporation: "Supporting multi-resolution streaming in MBMS", 3GPP TSG-RAN WG2 #67, R2-095157, Aug. 24-28, 2009, pp. 1-5, XP050389730, Shenzhen, China.

Office action mailed on Aug. 27, 2012 for the China application No. 201010236548.8, filing date Jul. 20, 2010, p. 1-7.

Office action mailed on Apr. 29, 2013 for the Taiwan application No. 099123858, filing date Jul. 20, 2010, p. 1-8.

\* cited by examiner

METHOD OF MULTIMEDIA BROADCAST MULTICAST SERVICE CONTENT AWARE SCHEDULING AND RECEIVING IN A WIRELESS COMMUNICATION SYSTEM AND RELATED COMMUNICATION DEVICE

CROSS REFERENCE TO RELATED APPLICATIONS

This application claims the benefit of U.S. Provisional Application No. 61/226,755, filed on Jul. 20, 2009 and entitled "METHOD AND APPARATUS FOR Content Aware Scheduling IN A WIRELESS COMMUNICATIONS SYSTEM", the contents of which are incorporated herein.

BACKGROUND OF THE INVENTION

1. Field of the Invention

The present invention relates to a method of multimedia broadcast multicast service (MBMS) content aware scheduling and receiving in a wireless communication system and related communication device, and more particularly, to a method for scheduling MBMS services of different resolution levels and for receiving an MBMS service according to requirements on the resolution level when performing the MBMS service and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). The LTE radio protocol stack includes the Layer 3, also known as the Radio Resource Control (RRC) layer, the Layer 2, consisting of three sub-layers that are the Packet Data Convergence Protocol (PDCP) layer, the Radio Link Control (RLC) layer, and the Medium Access Control (MAC) layer, and the Layer 1, also known as the Physical (PHY) layer.

Recently, the 3GPP is involved in the further advancements for E-UTRA and proposes an LTE-Advanced system as an enhancement of the LTE system. Carrier aggregation, where two or more component carriers are aggregated, is introduced into the LTE-Advanced system in order to support wider transmission bandwidths, e.g. up to 100 MHz and for spectrum aggregation. A UE of the LTE-Advanced system can simultaneously receive and/or transmit on multiple component carriers. Carrier aggregation allows a UE to aggregate a different number of component carriers of possibly different bandwidths in uplink and downlink.

Evolved multimedia broadcast multicast service (E-MBMS) has been introduced in the LTE specification to broadcast or multicast TV, films, information such as free overnight transmission of newspaper in a digital form. Two important scenarios have identified for the E-MBMS: one is single-cell broadcast, and the other is E-MBMS over a single frequency network (MBSFN). The MBSFN is a simulcast transmission technique that realizes transmission of identical waveforms at the same time from multiple cells covering a geographic area called an MBSFN area. A UE therefore observes multiple versions of the signal with different delays due to the multi-cell transmission. Since the MBSFN transmissions from the multiple cells are closely time-synchronized, the MBSFN transmission arrived at the UE is regarded as a transmission from a single cell and the UE may treat the MBSFN transmission in the same way as multi-path components of a single cell transmission without additional complexity. The MBSFN transmission takes place on dedicated subframes referred to as MBSFN subframes, which may also be used for non-MBMS data transmission when the MBSFN subframes are not allocated for MBMS data.

Please refer to FIG. 1, which is a diagram of E-MBMS architecture according to the prior art. A broadcast/multicast service center (BMSC) receives MBMS data generated from an MBMS content provider. An MBMS gateway is present between the BMSC and eNBs for delivering MBMS data to each eNB providing the MBMS service. A multicast coordination entity (MCE) is present between a mobility management entity (MME) and eNBs for allocating radio resources used by all eNBs in the MBSFN area for multi-cell MBMS transmission. The MCE may be a part of an eNB or another network element than E-UTRAN. To realize E-MBMS, the PHY layer of the LTE system offers information transfer services between a physical multicast channel (PMCH) and a downlink transport channel called multicast channel (MCH). The MCH is required to be broadcasted in the entire coverage area of each cell in the MBSFN area. Scheduling of each MCH is done by the MCE. The MAC layer of the LTE system offers data transfer services between the MCH and logical channels including a multicast traffic channel (MTCH) and a multicast control channel (MCCH), which are point-to-multipoint channels for transmitting traffic data and control information. A UE determines what subframes are used by each MTCH according to a dynamic scheduling information (DSI), which is generated by the eNB and indicate subframes used by each MTCH. The DSI can be carried in an MAC control element or in a separate logical channel, such as a multicast scheduling channel (MSCH).

The latest trend of mobile communication devices shows an increasing demand of smartphones, netbooks, or mobile internet devices, which are more diversified than ordinary mobile phones and enable advanced computing ability to implement a video compression standard such as H.264 or MPEG-4 commonly used for a video streaming service. That video compression standard is also foreseen to be used by E-MBMS. In the field of video compression, a video frame is compressed using different algorithms that are also called frame types, such as intra-frame (I-frame) or predicted frame (P-frame). An I-frame is the least compressible but does not require other video frames to decode, such as a conventional static image file. A P-frame, also known as a delta-frame, holds only the changes in the image from the previous frame and can use data from previous frames to decompress, which is more compressible than an I-frame. I-frames can be regarded as low-resolution data to present the least necessary information of a video, and P-frames can be regarded as high-resolution data to bring more detailed information. For an MBMS service as a video streaming service, an MBMS service of a high resolution level may include I-frames and P-frames to present the detail and an MBMS service of a low resolution level may include I-frames only. What resolution level an MBMS service is in depends on the number of resolutions the MBMS data (such as video frames) of the MBMS service have.

Note that, mobile communication devices having different screen sizes may have different requirements with respect to the resolution level when performing MBMS services. For example, a laptop computer is supposed to use a resolution level higher than that a smartphone uses for MBMS services. In addition, for a mobile communication device, a user may have different requirements on the same MBMS service at different time. For example, after the user shrinks the window size of a streaming video, the required resolution level of the video can be lowered. The user may use a picture-in-picture function when watching two or more videos in which one on the full screen requires a higher resolution level and the other in an inset window only requires a lower resolution level. In addition, the user may switch an active window of an MBMS service to another application window and puts the MBMS service window to the background, then only minimum resolution level is required or the mobile communication device stops receiving MBMS data until the user switches back to the MBMS service window.

However, the eNB has no way to know the screen size of each UE or how the user watches the MBMS service currently, and can only schedule an MBMS service including data having all levels of resolution to all UEs receiving the MBMS service. Each UE receives and decodes the same MBMS data, and thereby parts of MBMS data of required resolutions are recognized. If a UE requires only low-resolution MBMS data to be displayed, high-resolution MBMS data already decoded are discarded or unused and power consumption for receiving and processing these high-resolution MBMS data is wasted, which is a critical issue for UEs using batteries as a power source.

SUMMARY OF THE INVENTION

The present invention therefore provides a method of MBMS content aware scheduling and receiving in a wireless communication system.

According to one embodiment of the present invention, a method of MBMS content aware scheduling and receiving for a network of a wireless communication system includes receiving data of different resolutions generated from a data source from an MBMS content provider, and scheduling a plurality of MBMS services of different resolution levels formed with the received data on a plurality of multicast traffic channels overlapping in time, wherein data of an MBMS service of a first resolution level on a first multicast traffic channel are shared with another multicast traffic channel corresponding to an MBMS service of a second resolution higher than the first resolution.

According to another embodiment of the present invention, a method of MBMS content aware scheduling and receiving for a UE of a wireless communication system includes selecting a resolution level for performing an MBMS service according to a presented picture size of the MBMS service on a screen of the UE, and receiving the MBMS service of the selected resolution level on one of a plurality of multicast traffic channels overlapping in time, wherein the plurality of multicast traffic channels are corresponding to a plurality of MBMS services of different resolution levels scheduled by a network of the wireless communication system.

According to another embodiment of the present invention, a method of MBMS content aware scheduling and receiving for a network of a wireless communication system includes receiving data of different resolutions generated from a data source from an MBMS content provider, and scheduling a plurality of MBMS services of different resolution levels formed with the received data respectively on a plurality of multicast traffic channels non-overlapping in time, wherein data of an MBMS service of a first resolution level on a multicast traffic channel are repeated on another multicast traffic channel corresponding to an MBMS service of a second resolution level higher than the first resolution level.

According to another embodiment of the present invention, a method of MBMS content aware scheduling and receiving for a UE of a wireless communication system includes selecting a resolution level for performing an MBMS service according to a displayed picture size of the MBMS service on a screen of the UE, and receiving the MBMS service of the selected resolution level on one of a plurality of multicast traffic channels non-overlapping in time, wherein the plurality of multicast traffic channels are respectively corresponding to a plurality of MBMS services of different resolution levels scheduled by a network of the wireless communication system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
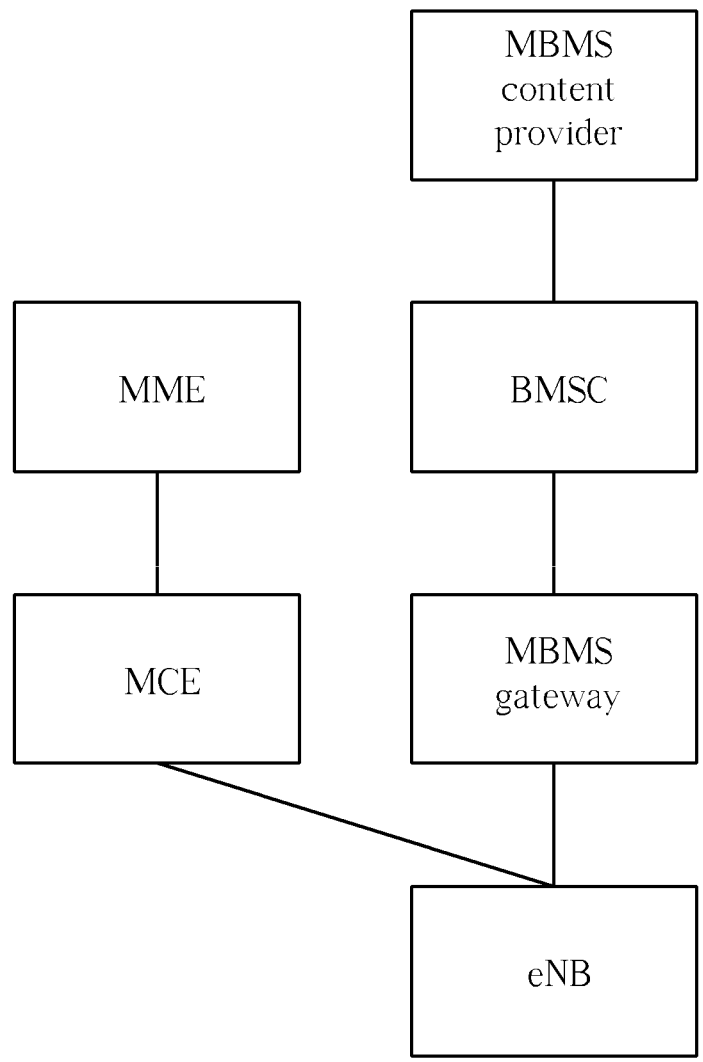
FIG. 1 is a diagram of E-MBMS architecture according to the prior art.
Figure 2:
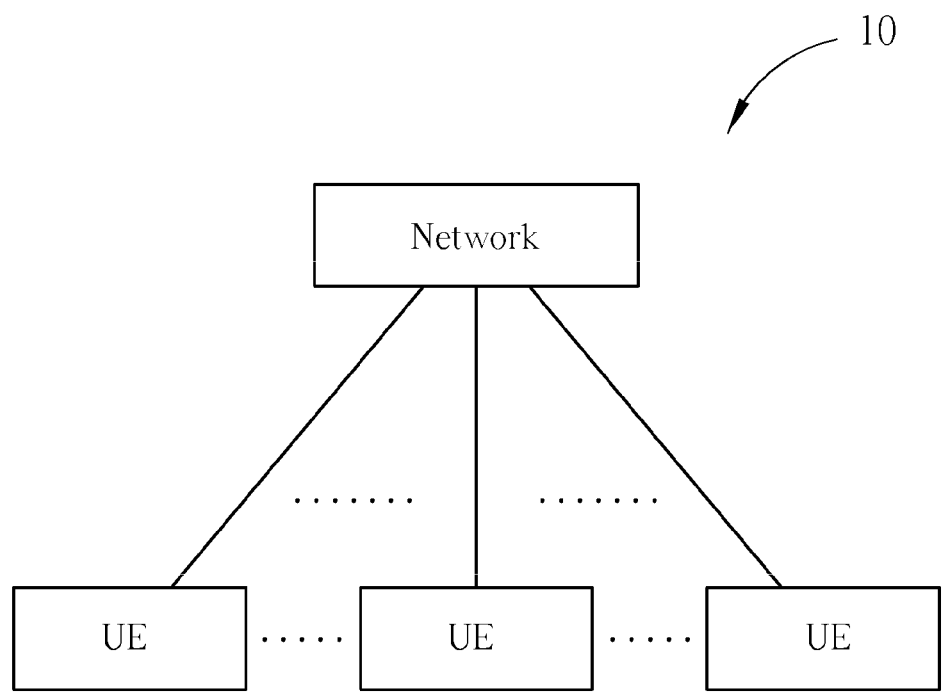
FIG. 2 is a schematic diagram of an exemplary wireless communication system.

Please refer to FIG. 2, which illustrates a schematic diagram of an exemplary wireless communication system 10. Briefly, the wireless communication system 10 is composed of a network and a plurality of mobile devices. The wireless communication system 10 can be a LTE system, a LTE-advanced system, or any other similar network system supporting evolved multimedia broadcast multicast service (E-MBMS). In the LTE or LTE-Advanced system, the network can be referred as an E-UTRAN comprising a plurality of eNBs, and the mobile devices are referred as UEs. Each eNB is able to communicate with an MBMS content provider to receive MBMS data. The UEs can be devices such as mobile phones, computer systems, etc. This terminology will be used throughout the application for ease of reference; however, this should not be construed as limiting the disclosure to any one particular type of network. In some examples, the network and the UE may be seen as a transmitter or receiver according to transmission direction, e.g. for uplink, the UE is the transmitter and the network is the receiver, and for downlink, the network is the transmitter and the UE is the receiver.

Figure 3:
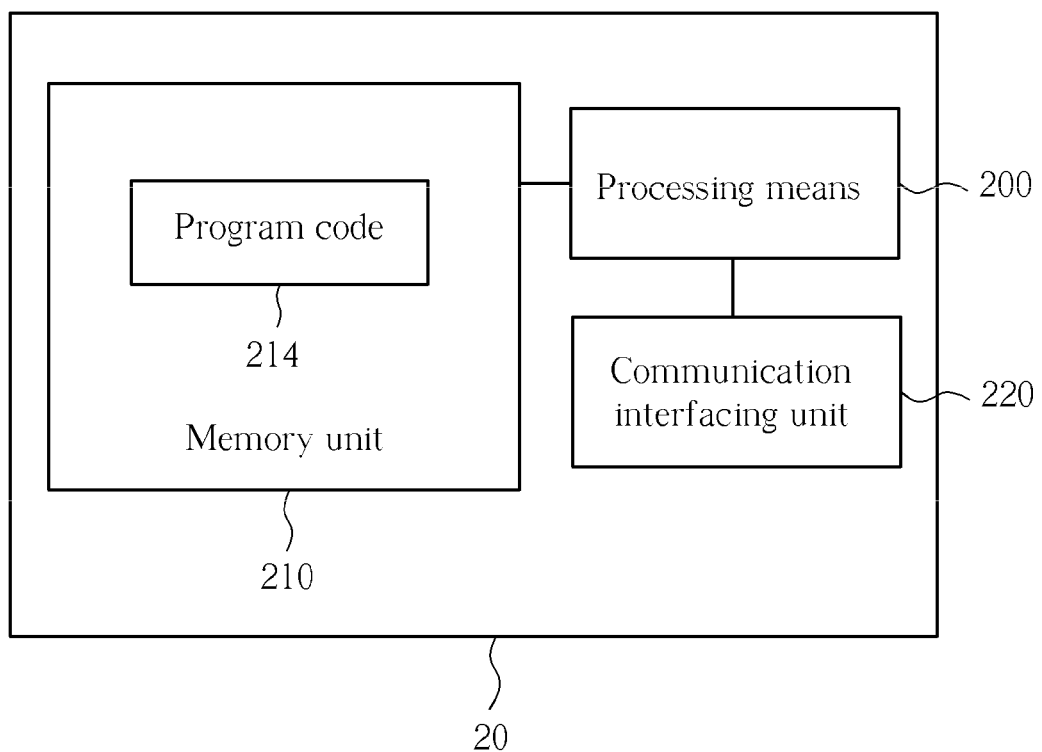
FIG. 3 is a schematic diagram of an exemplary communication device.

Please refer to FIG. 3, which is a schematic diagram of an exemplary communication device 20. The communication device 20 can be the network or the UE shown in FIG. 2 and may include a processing means 200 such as a microprocessor or ASIC, a memory unit 210, and a communication interfacing unit 220. The memory unit 210 may be any data storage device that can store program code 214 for access by the processing means 200. Examples of the memory unit 210 include but are not limited to a subscriber identity module (SIM), read-only memory (ROM), flash memory, randomaccess memory (RAM), CD-ROM, magnetic tape, floppy disk, and optical data storage device. The communication interfacing unit 220 is preferably a radio transceiver for wirelessly communicating according to processing results of the processing means 200.

Figure 4:
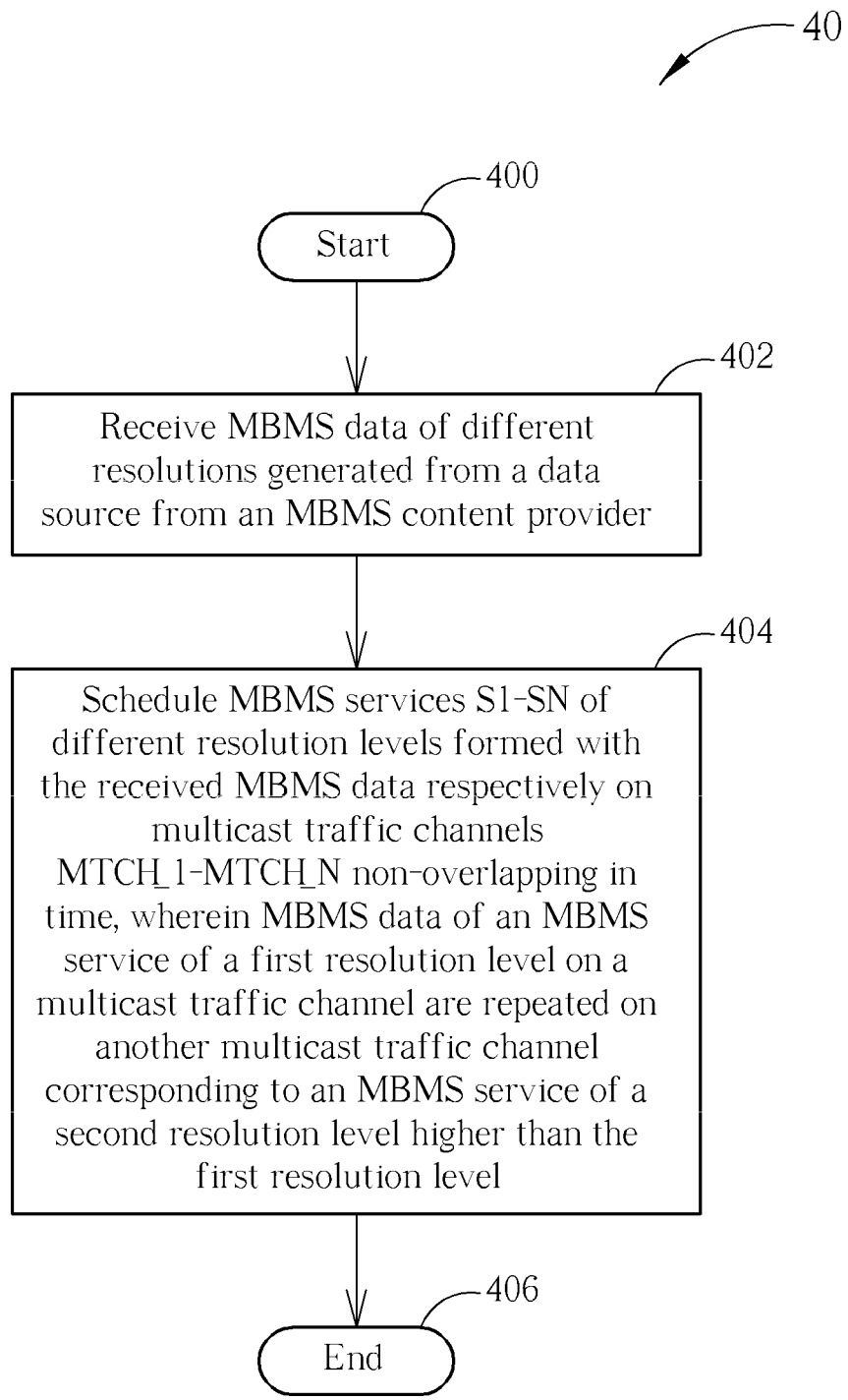
FIG. 4 is a flowchart of an exemplary process.

To improve efficiency of power consumption for the UE when MBMS services are performed, MBMS content aware scheduling and receiving are necessary for the eNB and the UE. Please refer to FIG. 4, which is a flowchart of an exemplary process 40. The process 40 is utilized for MBMS content aware scheduling and receiving for the network of the wireless communication system 10. The process 40 can be compiled into the program code 214. The process 40 includes the following steps:

Step 400: Start.

Step 402: Receive MBMS data of different resolutions generated from a data source from an MBMS content provider.

Step 404: Schedule MBMS services S1-SN of different resolution levels formed with the received MBMS data respectively on multicast traffic channels MTCH_1-MTCH_N non-overlapping in time, wherein MBMS data of an MBMS service of a first resolution level on a multicast traffic channel are repeated on another multicast traffic channel corresponding to an MBMS service of a second resolution level higher than the first resolution level.

Step 406: End.

According to Step 402, the eNB receives MBMS data of different resolutions generated from a data source from an MBMS content provider, which are used for forming MBMS services S1-SN of different resolution levels that provides the same program to be played in N resolution levels. The number of resolutions the received MBMS data have is determined by the MBMS content provider and not limited in the process 40. For example, when the received MBMS data have two resolutions, the received MBMS data includes low-resolution MBMS data, e.g. I-frames compressed from a video and high-resolution MBMS data, e.g. P-frames compressed from the same video; the MBMS service of a high resolution level is formed with the low-resolution MBMS data and the high-resolution MBMS data; the MBMS service of a low resolution level is formed with the low-resolution MBMS data only.

After receiving MBMS data, according to Step 404, the eNB schedules the MBMS services S1-SN respectively on multicast traffic channels MTCH_1-MTCH_N non-overlapping in time, in which subframes of a multicast traffic channel are independent from subframes of other multicast traffic channels. Since the multicast traffic channels MTCH_1-MTCH_N are non-overlapping, the eNB has to repeat MBMS data of a certain resolution on multicast traffic channels requiring that MBMS data.

Figure 5:
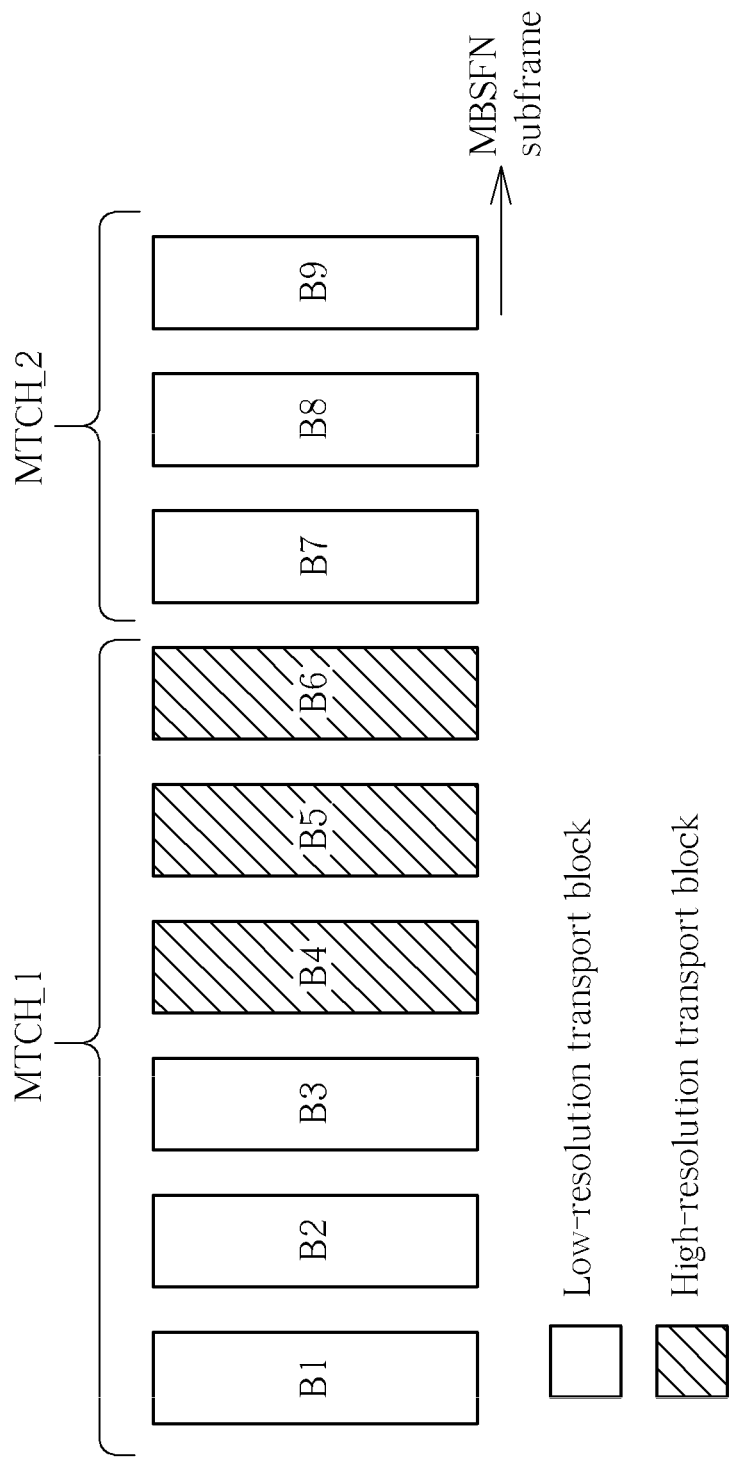
FIG. 5 is a diagram of MBSFN resource allocation according to the process of FIG. 4.

Please refer to FIG. 5, which is a diagram of MBSFN (E-MBMS over a single frequency network) resource allocation according to the process 40. In FIG. 5, transport blocks B1-B9 allocated on MBSFN subframes are generated from the received MBMS data having two resolutions. The first 6 MBSFN subframes are a multicast traffic channel MTCH_1 for transmitting an MBMS service of a high resolution level, including low-resolution transport blocks B1-B3 and high-resolution transport blocks B4-B6. The last 3 MBSFN subframes are a multicast traffic channel MTCH_2 for transmitting an MBMS service of a low resolution level, including only low-resolution transport blocks B7-B9 the same as B1-B3. Note that, FIG. 5 is one of examples according to the process 40 and whether the high-resolution transport blocks or the low-resolution transport blocks are first transmitted is not limited in the present invention. The UE determines what subframes are used by each multicast traffic channel according to dynamic scheduling information.

From the above, for N MBMS services of different resolution levels, the received MBMS data of the lowest resolution are repeatedly allocated on all the N multicast traffic channels, MBMS data of the second lowest resolution are repeatedly allocated on (N−1) multicast traffic channels, and so on. In a word, MBMS data of an MBMS service of a first resolution level on a multicast traffic channel are repeated on another multicast traffic channel corresponding to an MBMS service of a second resolution level higher than the first resolution level. The MBMS services S1-SN are not necessary to be scheduled on multicast traffic channels mapped to the same multicast channel and may be scheduled on multicast traffic channels mapped to different multicast channels.

Figure 6:
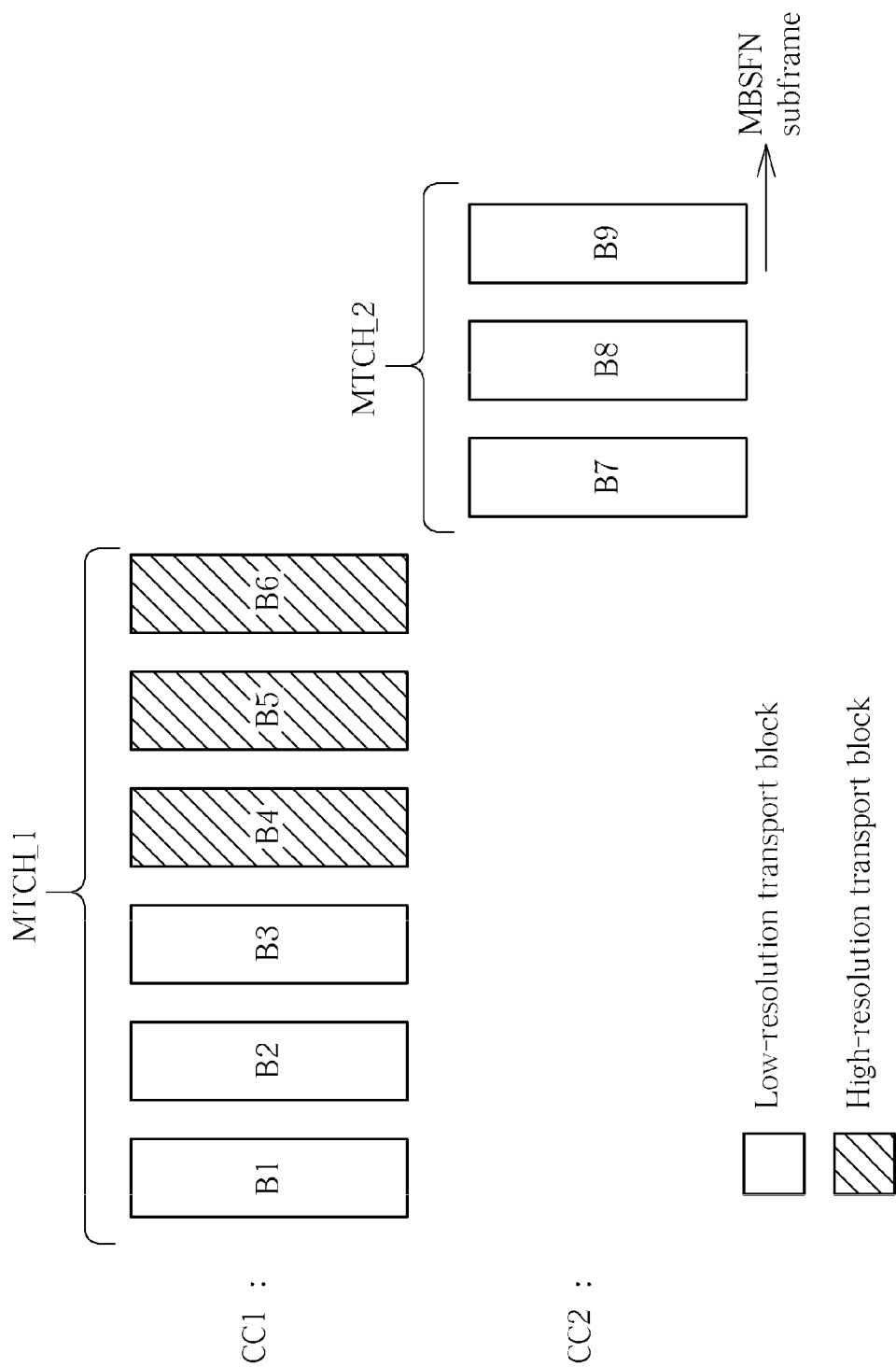
FIG. 6 is a diagram of MBSFN resource allocation according to the process of FIG. 4 under carrier aggregation.

MBSFN resource allocation shown in FIG. 5 is an example for the wireless communication system 10 using a single carrier. For the wireless communication system 10 providing carrier aggregation functionality, since different component carriers have different MBSFN resource allocation, the eNB can schedule the MBMS services S1-SN on different component carriers. Please refer to FIG. 6, which is a diagram of MBSFN resource allocation according to the process 40 when the wireless communication system 10 provides carrier aggregation functionality. In FIG. 6, an MBMS services S1 of a high resolution level and an MBMS services S2 of a low resolution level are transmitted on component carriers CC1 and CC2, respectively. The first 6 MBSFN subframes are a multicast traffic channel MTCH_1 for transmitting the MBMS service S1, including low-resolution transport blocks B1-B3 and high-resolution transport blocks B4-B6, on the component carrier CC1. The last 3 MBSFN subframes are a multicast traffic channel MTCH_2 for transmitting the MBMS service S2, including only low-resolution transport blocks B7-B9, on the component carrier CC2.

In the prior art, the eNB broadcasts an MBMS service including MBMS data of all levels of resolution and a UE receives this MBMS service regardless of the screen size of the UE or how a user watches the MBMS service on the UE, which results in inefficient power consumption. In comparison, when the eNB schedules MBMS services according to the process 40, the UE has the possibility to receive only MBMS data of required resolutions and thereby improves efficiency of power consumption.

Figure 7:
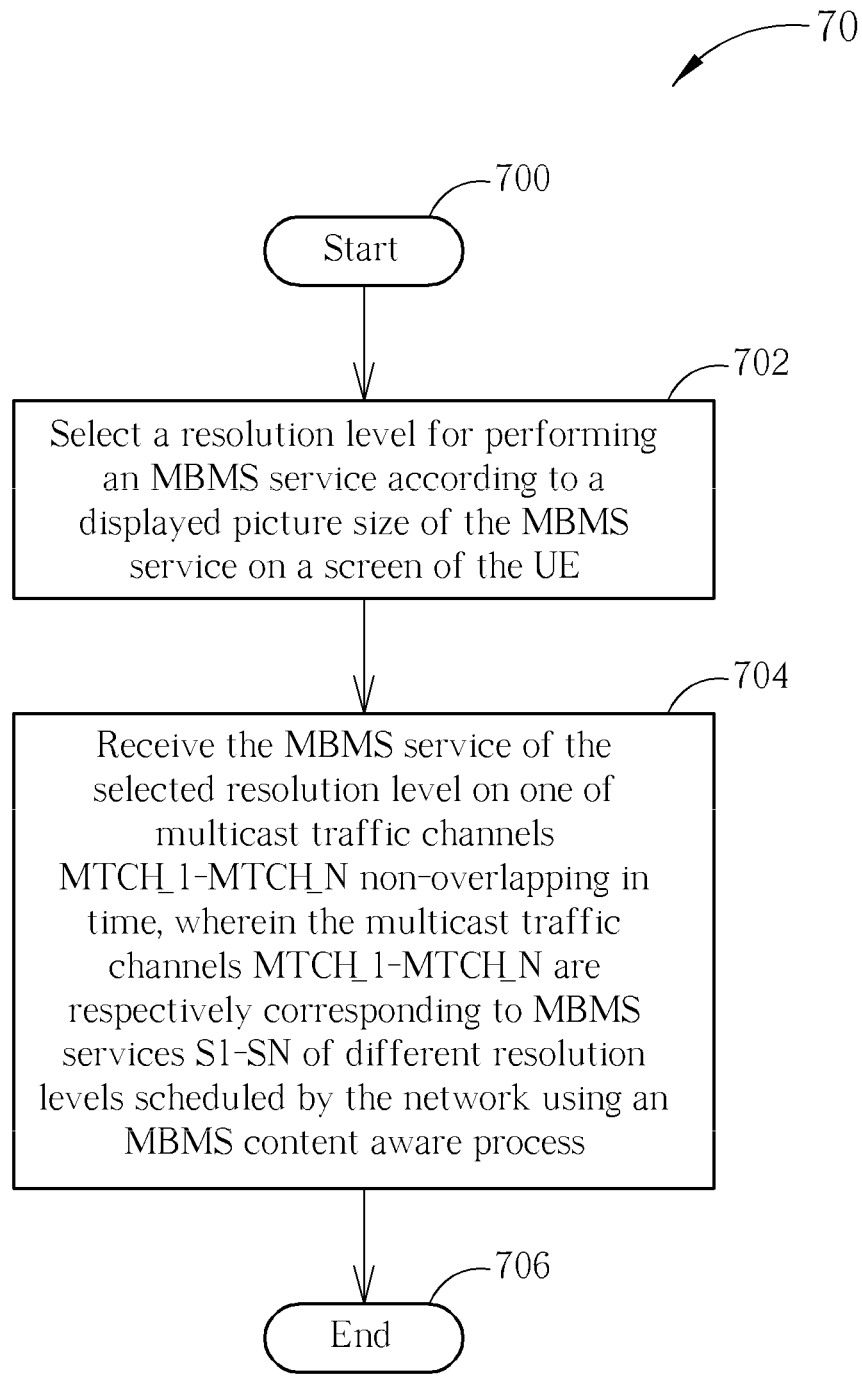
FIG. 7 and FIG. 8 are flowcharts of exemplary processes.

Please refer to FIG. 7, which is a flowchart of an exemplary process 70. The process 70 is utilized for MBMS content aware scheduling and receiving for a UE of the wireless communication system 10. The process 70 can be compiled into the program code 214. The process 70 includes the following steps:

Step 700: Start.

Step 702: Select a resolution level for performing an MBMS service according to a displayed picture size of the MBMS service on a screen of the UE.

Step 704: Receive the MBMS service of the selected resolution level on one of multicast traffic channels MTCH_1-MTCH_N non-overlapping in time, wherein the multicast traffic channels MTCH_1-MTCH_N are respectively corresponding to MBMS services S1-SN of different resolution levels scheduled by the network using an MBMS content aware process.

Step 706: End.

The UE using the process 70 cooperates with the eNB using the process 40. According to Step 702, the UE selects a resolution level for performing an MBMS service according to the actual displayed picture size of the MBMS service, such as the screen size of the UE, the size of an inset window, or even no displayed picture (when the MBMS service window is put in the background), which depends on the how the user uses the UE. According to Step 704, the UE receives the MBMS service of the selected resolution level on a corresponding one of multicast traffic channels MTCH_1-MTCH_N non-overlapping in time. Note that, the multicast traffic channels MTCH_1-MTCH_N are respectively corresponding to MBMS services S1-SN of different resolution levels that are scheduled by the eNB using the process 40 as the MBMS content aware process. It is also known from the process 40 that MBMS data of the MBMS service of the selected resolution level on the corresponding multicast traffic channel are repeated on another multicast traffic channel corresponding to an MBMS service of a resolution level higher than the selected resolution level.

In the prior art, the eNB can only schedule the MBMS service including MBMS data of all levels of resolution and the UE has to receives and decodes the MBMS data of all levels of resolution more than the required resolutions the UE actually requires. In comparison, through the process 70, the UE selects a resolution level for the MBMS service and then receives the MBMS service of the selected resolution level, so that power consumption of the UE is saved from receiving and processing MBMS data of unnecessary resolutions.

Since the eNB using the process 40 may schedule MBMS services on different component carriers when the wireless communication system 10 provides carrier aggregation functionality, the UE may receive the MBMS service of the selected resolution level on a corresponding component carrier. In addition, when the eNB schedules the MBMS services S1-SN on different multicast channels, the UE may receive the MBMS service of the selected resolution level on a corresponding multicast channel.

Figure 8:
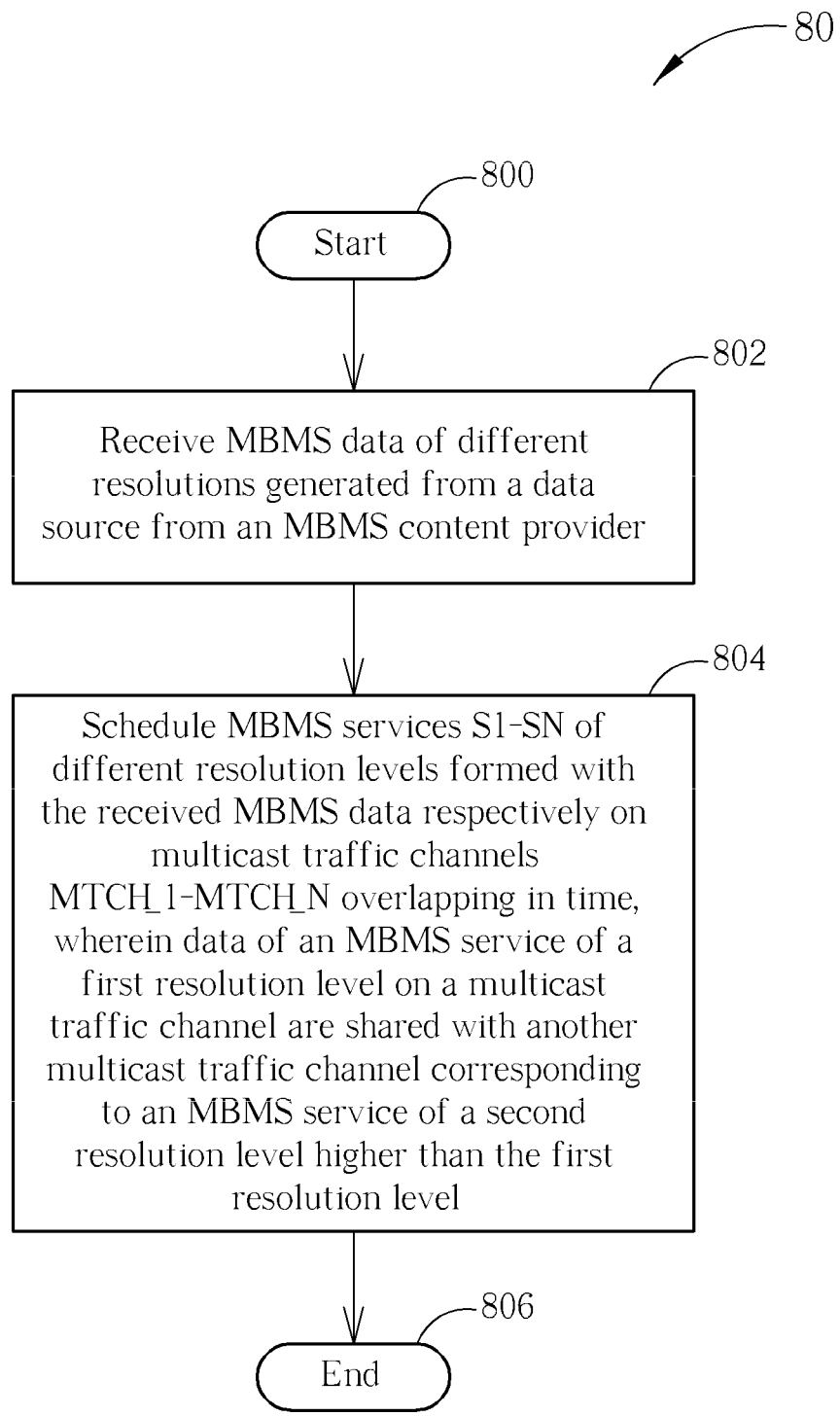

Please refer to FIG. 8, which is a flowchart of an exemplary process 80. The process 80 is utilized for MBMS content aware scheduling and receiving for the network of the wireless communication system 10 in order to help the network to utilize MBSFN resources more efficiently than using the process 40. The process 80 can be compiled into the program code 214. The process 80 includes the following steps:

Step 800: Start.

Step 802: Receive MBMS data of different resolutions generated from a data source from an MBMS content provider.

Step 804: Schedule MBMS services S1-SN of different resolution levels formed with the received MBMS data respectively on multicast traffic channels MTCH_1-MTCH_N overlapping in time, wherein data of an MBMS service of a first resolution level on a multicast traffic channel are shared with another multicast traffic channel corresponding to an MBMS service of a second resolution level higher than the first resolution level.

Step 806: End.

Step 802 is similar to Step 402 of the process 40 and is not detailed described herein. After receiving MBMS data, according to Step 804, the eNB schedules the MBMS services S1-SN on the multicast traffic channels MTCH_1-MTCH_N that are overlapping in time, which indicates that the eNB does not require repeating the received MBMS data of a certain resolution and also indicates that MBMS data of an MBMS service of a first resolution level on a multicast traffic channel are shared with another multicast traffic channel corresponding to an MBMS service of a second resolution level higher than the first resolution level.

Figure 9:
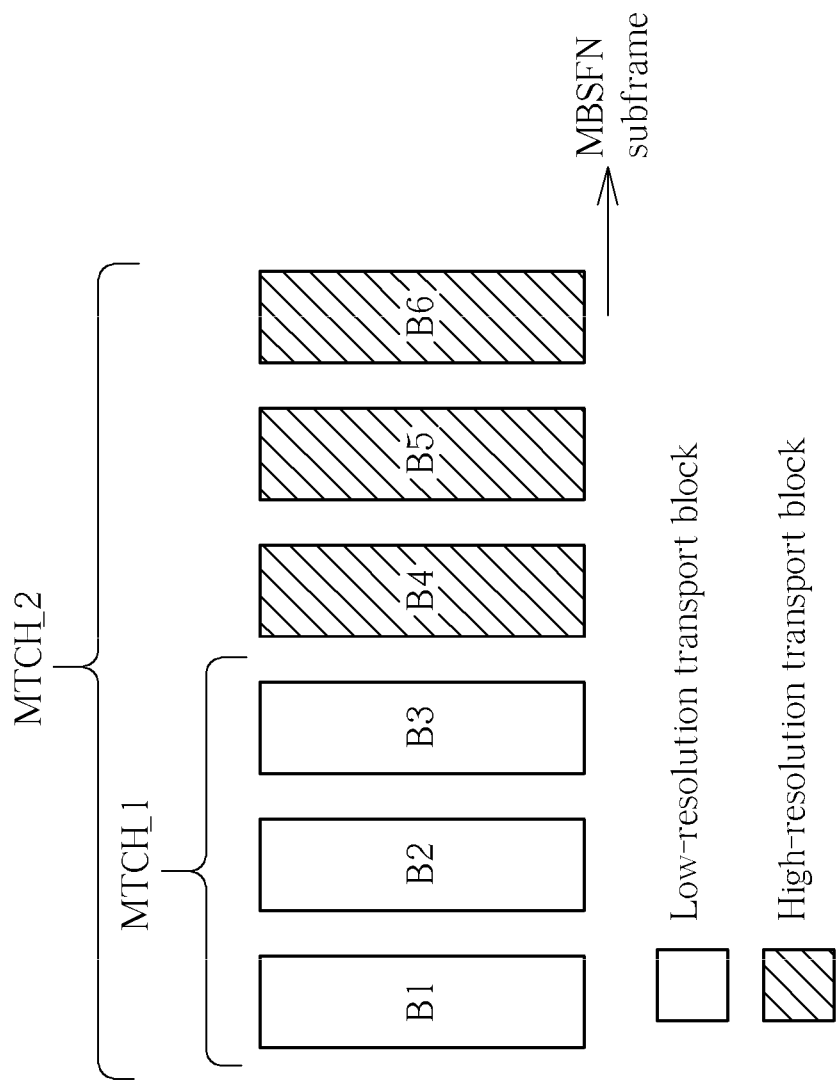
FIG. 9 is a diagram of MBSFN resource allocation according to the process of FIG. 8.

Please refer to FIG. 9, which is a diagram of MBSFN resource allocation according to the process 80. In FIG. 9, transport blocks B1-B6 allocated on MBSFN subframes are generated from the received MBMS data having two resolutions. The first 3 MBSFN subframes are a multicast traffic channel MTCH_1 for transmitting an MBMS service of a low resolution level, including the low-resolution transport blocks B1-B3. The total 6 MBSFN subframes are a multicast traffic channel MTCH_2 for transmitting an MBMS service of a high resolution level including the low-resolution transport blocks B1-B3 and the high-resolution transport blocks B4-B6. Note that FIG. 9 is one of examples of MBSFN resource allocation according to the process 80. To realize the MBSFN resource allocation illustrated in FIG. 9 in which the multicast traffic channels MTCH_1-MTCH_N begins at the same time, dynamic scheduling information generated by the eNB has to carry the stop timing information of each multicast traffic channel.

As can be seen in FIG. 5 and FIG. 6, MBSFN resource allocation according to the process 40 is not efficient enough since the same MBMS data are repeated on MBSFN resources. In comparison, through the process 80, MBMS data of different resolutions are not repeated and thus MBSFN resources can be used more efficiently.

It is not necessary for the eNB using the process 80 to schedule the MBMS services S1-SN on multicast traffic channels mapped to the same multicast channel. The eNB using the process 80 may schedule the MBMS services S1-SN on multicast traffic channels mapped to different multicast channels. In other words, the eNB may schedule the MBMS services S1-SN on different multicast channels. In addition, the eNB using the process 80 may schedule the MBMS services S1-SN on different component carriers when the wireless communication system 10 provide carrier aggregation functionality.

Figure 10:
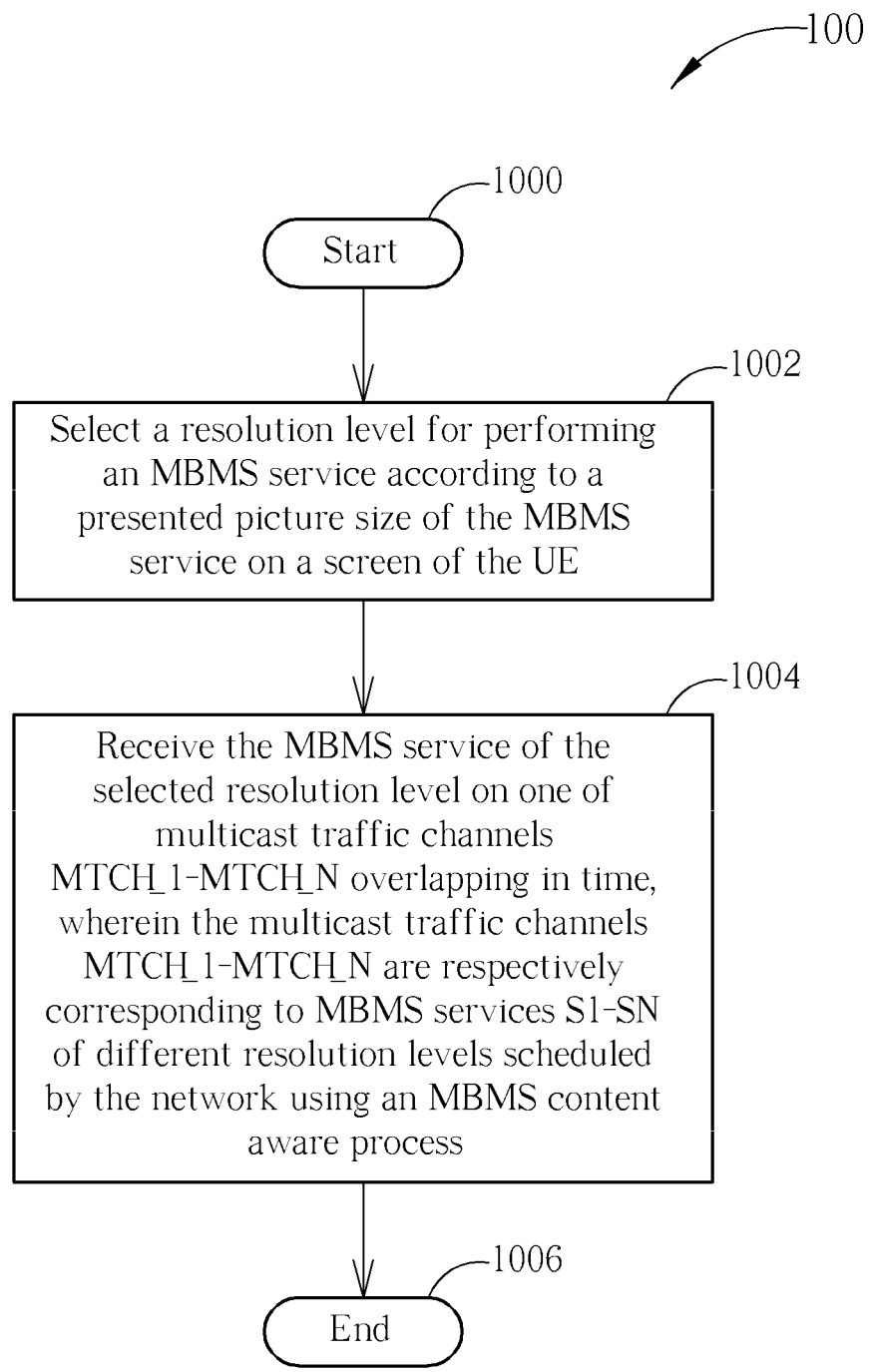
FIG. 10 is a flowchart of an exemplary process.

Please refer to FIG. 10, which is a flowchart of an exemplary process 100. The process 100 is utilized for MBMS content aware scheduling and receiving for a UE of the wireless communication system 10. The process 100 can be compiled into the program code 214. The process 100 includes the following steps:

Step 1000: Start.

Step 1002: Select a resolution level for performing an MBMS service according to a presented picture size of the MBMS service on a screen of the UE.

Step 1004: Receive the MBMS service of the selected resolution level on one of multicast traffic channels MTCH_1-MTCH_N overlapping in time, wherein the multicast traffic channels MTCH_1-MTCH_N are respectively corresponding to MBMS services S1-SN of different resolution levels scheduled by the network using an MBMS content aware process.

Step 1006: End.

The UE using the process 100 cooperates with the eNB using the process 80. Step 1002 is similar to Step 702 of the process 70 and is not repeated herein. After the resolution level for performing an MBMS service is selected, according to Step 1004, the UE receives the MBMS service of the selected resolution level on a corresponding one of multicast traffic channels MTCH_1-MTCH_N. The overlapping multicast traffic channels MTCH_1-MTCH_N are respectively corresponding to MBMS services S1-SN of different resolution levels that are scheduled by the eNB using the process 80 as the MBMS content aware process. When the eNB schedules the MBMS services S1-SN on different component carriers, the UE receives the MBMS service of the selected resolution level on a corresponding component carrier. When the eNB schedules the MBMS services S1-SN on different multicast channels, the UE receives the MBMS service of the selected resolution level on a corresponding multicast channel.

In conclusion, through the exemplary processes, the eNB schedules the MBMS services of different resolution levels generated from the same data source on overlapping or non-overlapping multicast traffic channels and the UE therefore receives the MBMS service of a resolution level that is necessary for the UE. Therefore, power consumption of the UE is reduced when performing MBMS service, which is especially beneficial for the UE using a battery as a power source.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of multimedia broadcast multicast service (MBMS) content aware scheduling and receiving for network of a wireless communication system, the method comprising:
   receiving data of different resolutions generated from a data source from an MBMS content provider; and
   scheduling a plurality of MBMS services of different resolution levels formed with the received data respectively on a plurality of multicast traffic channels overlapping in time, wherein subframes of a first multicast traffic channel for a MBMS service of a lower resolution level are shared with subframes of a second multicast traffic channel for a MBMS service of a higher resolution level.

2. The method of claim 1, wherein the plurality of MBMS services are on the same component carrier or different component carriers.

3. The method of claim 1, wherein plurality of MBMS services are on the same multicast channel or different multicast channels.

4. A method of multimedia broadcast multicast service (MBMS) content aware scheduling and receiving for a user equipment of a wireless communication system, the method comprising:
   selecting a resolution level for performing an MBMS service according to a presented picture size of the MBMS service on a screen of the user equipment; and
   receiving the MBMS service of the selected resolution level on one of a plurality of multicast traffic channels overlapping in time, wherein subframes of a first multicast traffic channel for a MBMS service of a lower resolution level are shared with subframes of a second multicast traffic channel for a MBMS service of a higher resolution level.

5. The method of claim 4, wherein the network schedules the plurality of MBMS services on a component carrier or a plurality of component carriers and the user equipment receives the MBMS service of the selected resolution level on a corresponding component carrier.

6. The method of claim 4, wherein the network schedules the plurality of MBMS services on a multicast channel or a plurality of multicast channels and the user equipment receives the MBMS service of the selected resolution level on a corresponding multicast channel.

* * * * *